United States Patent [19]

Wussow

[11] 4,209,213

[45] Jun. 24, 1980

[54] BRUSH HOLDER AND SLIP RING ASSEMBLY

[75] Inventor: James M. Wussow, Vincentown, N.J.

[73] Assignee: Warner Electric Brake & Clutch Company, South Beloit, Ill.

[21] Appl. No.: 894,526

[22] Filed: Apr. 10, 1978

[51] Int. Cl.[2] .......... G01L 1/22

[52] U.S. Cl. .......... 339/5 R; 310/232; 310/239

[58] Field of Search .......... 310/239, 71, 232, 242, 310/231, 245, 219, 247, 238, 43, 128, 78, 100, 92; 339/8 R, 5 R, 5 M, 5 A; 264/272; 192/84 R, 84 A, 84 B, 84 T

[56] References Cited

U.S. PATENT DOCUMENTS

| | | | |
|---|---|---|---|
| B 566,556 | 3/1976 | Jensen | 339/8 R |
| 2,920,300 | 1/1960 | Oetzel | 339/8 R |
| 2,942,104 | 7/1960 | Jaeschke | 192/84 R |
| 3,073,979 | 1/1963 | Potter | 310/231 |
| 3,289,140 | 11/1966 | Slack | 310/232 |
| 3,527,971 | 9/1970 | Means | 310/239 |
| 3,559,145 | 1/1971 | Spencer | 339/8 R |
| 3,636,394 | 1/1972 | Forste | 310/232 |
| 3,704,769 | 12/1972 | Spencer | 192/84 R |
| 3,735,172 | 5/1973 | Battaglia | 310/239 |
| 4,041,339 | 8/1977 | Huber | 339/239 |
| 4,086,509 | 4/1978 | Manson | 310/232 |

FOREIGN PATENT DOCUMENTS

| | | | |
|---|---|---|---|
| 1167969 | 4/1964 | Fed. Rep. of Germany | 310/232 |
| 2311805 | 9/1973 | Fed. Rep. of Germany | 310/232 |

*Primary Examiner*—R. Skudy

*Attorney, Agent, or Firm*—Leydig, Voit, Osann, Mayer & Holt, Ltd.

[57] ABSTRACT

A brush holder and slip ring assembly in which the housing of the brush holder and the rotor body of the slip ring assembly are both made of plastic. Conductive terminal strips have portions encapsulated by the plastic of the housing of the brush holder and are adapted to make contact with axially spaced brushes. Conductive terminal strips and slip rings are partially encapsulated by the plastic of the rotor of the slip ring assembly, the slip rings being disposed in contact with the brushes.

11 Claims, 10 Drawing Figures

BRUSH HOLDER AND SLIP RING ASSEMBLY

BACKGROUND OF THE INVENTION

This invention relates to an electrical brush holder and slip ring assembly of the type used to conduct electric current between a voltage source and a relatively rotatable utilization device. The utilization device may, for example, be an electromagnetic clutch having a winding which rotates with a shaft or the like and which is energized when supplied with excitation current from the voltage source.

Typically, the brush holder is supported in a stationary position and includes a housing having at least two brushes which are connected to the voltage source by way of terminals on the housing. The slip ring assembly usually comprises a rotor connected to rotate with the utilization device and rotatably journaled by a bearing located between the brush holder and the slip ring assembly. The rotor includes at least two conductors or "slip rings" which contact and rotate past the brushes to transfer current between the stationary brush holder and the rotating slip ring assembly. In addition, the rotor carries conducting elements which are connected to the slip rings and which define terminals adapted to be connected to the utilization device.

SUMMARY OF THE INVENTION

The general aim of the present invention is to provide a brush holder and slip ring assembly which is easier and less expensive to manufacture and assemble than prior apparatus of the same general type and which, at the same time, is more reliable and trouble-free in service use.

A related object of the invention is to provide a brush holder and slip ring assembly molded of plastic and having many components which are uniquely assembled in place as an incident to molding the brush holder and the slip ring assembly.

Another object is to provide a brush holder and slip ring assembly in which current is conducted between the brush holder and the rotor without passing through the bearing of the assembly, arcing of the current across the components of the bearing thus being avoided so as to increase the service life of the bearing.

A more detailed object is to provide a brush holder whose terminals are of relatively simple and inexpensive construction and are adapted to be molded in place in the housing of the holder so as to simplify the procedure involved in assembling the terminals and the housing.

A further object of the invention is to provide a unique slip ring assembly in which the slip rings and the conducting elements defining the terminals of the assembly may be anchored in place during molding of the rotor.

The invention also resides in the novel construction of the slip rings enabling both rings of the assembly to be of identical construction.

These and other objects and advantages of the invention will become more apparent from the following detailed description when taken in conjunction with the accompanying drawings.

DETAILED DESCRIPTION OF THE PREFERRED EMBODIMENTS

Figure 1:
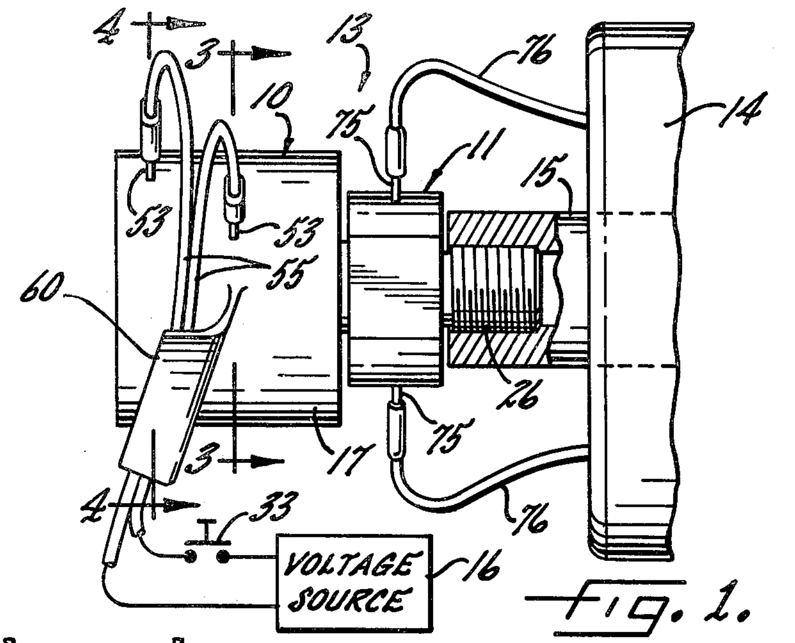
FIG. 1 is a side elevational view of a typical utilization device equipped with one embodiment of a brush holder and slip ring assembly incorporating the unique features of the present invention, certain parts being broken away and shown in section.

As shown in the drawings for purposes of illustration, the invention is embodied in a brush holder 10 and a slip ring assembly 11, the holder and the assembly herein being combined into a single unit 13. While the unit lends itself to many applications, it is shown in the present instance as being used with an electromagnetic clutch 14 having a winding (not illustrated) adapted to rotate with a shaft 15 and adapted to be energized when supplied with excitation current from a suitable voltage source 16 which may be located in a stationary position remote from the clutch.

In general, the brush holder and slip ring assembly unit 13 serves to transfer current between the stationary voltage source 16 and the rotatable winding of the clutch 14. The brush holder 10 is mounted in a stationary position adjacent one end of the shaft 15 and includes a tubular housing 17 (FIG. 2) which supports brushes 19 and 20 (FIGS. 3 and 4) disposed in one end portion of the housing and connected by conductors 21 and 22 to the terminals of the voltage source 16. A bearing 23 (FIG. 2) is mounted in the other end of the housing 17 and rotatably supports the slip ring assembly 11, the latter including a rotor 24 having a body 25 with a threaded end portion 26 adapted to be screwed into the end of the shaft 15 so that the rotor will turn with the shaft. The other end of the rotor 24 carries conductors 29 and 30—commonly referred to as slip rings—positioned to contact and rotate past the brushes 19 and 20, respectively, to transfer current between the stationary brush holder 10 and the rotating slip ring assembly 11. The rotor 24 also carries additional conductors 31 and 32 connected electrically to the slip-rings 29 and 30, respectively, and adapted to be connected to the terminals of the winding of the clutch 14. Accordingly, current is conducted between the voltage source and the clutch winding by way of the conductors 21 and 22, the brushes 19 and 20, the slip rings 29 and 30 and the conductors 31 and 32. A switch 33 (FIG. 1) may be located in the circuit between the voltage source 16 and the brush holder 10 and may be closed and opened when it is desired to energize and de-energize the clutch winding.

The present invention contemplates a new brush holder 10 and a new slip ring assembly 11 each of which in itself may be easily and economically manufactured and assembled and further contemplates constructing the holder 10 and the assembly 11 such that the two may be readily and reliably assembled with one another to form the combined unit 13. In addition, the invention provides a unit 13 in which the current is transferred between the brush holder 10 and the slip ring assembly 11 without flowing through the bearing 23 and thus there is no danger of the current arcing across the components of the bearing and reducing the life thereof.

Specifically, the tubular housing 17 of the brush holder 10 is molded of relatively rigid plastic and, as molded, the housing is open at both ends and is formed with a central bore 35 (FIG. 2) for receiving the slip rings 29 and 30 of the slip ring assembly 11. One end portion of the housing is molded with a counterbore indicated at 36 and sized to receive the outer race of the bearing 23 with a press fit. The opposite or rear end of the housing also is molded with a counterbore indicated by the reference numeral 37 and having walls molded integrally with guide channels 39 and 40 (FIGS. 4 and 3) which support the brushes 19 and 20, respectively, for radial sliding. Herein there are two rear brushes 19 and two rear guide channels 39 with the two brushes 19 being spaced diametrically from one another and positioned to contact opposite sides of the slip ring 29. There also are two forward brushes 20 and two forward guide channels 40. The brushes 20 are spaced diametrically from one another and are spaced axially forwardly of the brushes 19 so as to contact opposite sides of the slip ring 30. As shown in FIG. 4, each of the brushes 19 is spaced ninety degrees from each of the brushes 20.

Each of the brushes 19 and 20 is in the form of a small carbon block and includes a concave inner face which is radiused in accordance with the diameter of the slip rings 29 and 30. One end of a copper lead wire 43 (FIG. 3) is connected to the outer face of each brush while a terminal button 44 is attached to the opposite end of the lead wire. A coil spring 45 surrounds each lead wire and is compressed between the brush and the terminal button to urge the brush into contact with its respective slip ring and to urge the terminal button outwardly toward the inside wall of the housing 17.

In carrying out the invention, the conductors 21 and 22 for connecting the brushes 19 and 20 to the terminals of the voltage source 16 are partially encapsulated in the plastic housing 17 of the brush holder 10 and are molded in place when the housing is formed. Moreover, one conductor 21 serves both of the brushes 19, the other conductor 22 serves both of the brushes 20, and each conductor is identical to the other so as to reduce the number of conductors required and the cost of manufacturing such conductors.

More particularly, each of the conductors 21 and 22 is formed from a metal strip and is substantially semi-circular in shape. Each strip 21, 22 includes a substantially circumferentially extending portion 50 (FIGS. 3 and 4) having approximately the same radius as the housing 17 and having straight end sections. Each strip further includes a substantially radially extending portion or tab 53 which projects outwardly from the circumferentially extending portion. The radially extending tab of each strip is offset angularly by about sixty degrees from one end of the strip, the radially extending tabs of the two strips defining terminals to which lead wires 55 (FIG. 1) extending from the voltage source 16 may be connected. In addition to the outwardly extending tab 53, each of the strips 21, 22 is formed with an apertured inwardly projecting tab 56 (FIG. 4) which defines a terminal whose purpose will be explained subsequently. The inwardly projecting tab 56 is bent from one side of the strip 21, 22 and is located about midway between the tab 53 and that end of the strip most nearly adjacent the tab 53.

Figure 3:
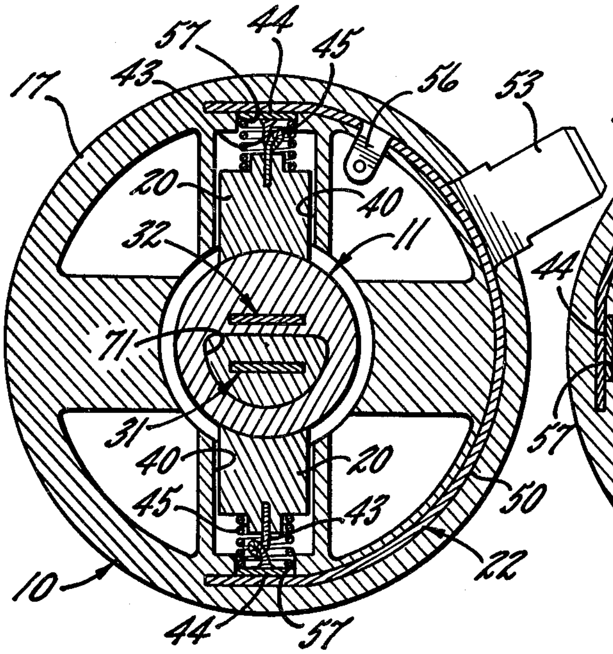
FIGS. 3 and 4 are enlarged cross-sections taken substantially along the lines 3—3 and 4—4, respectively, of FIG. 1.
Figure 4:
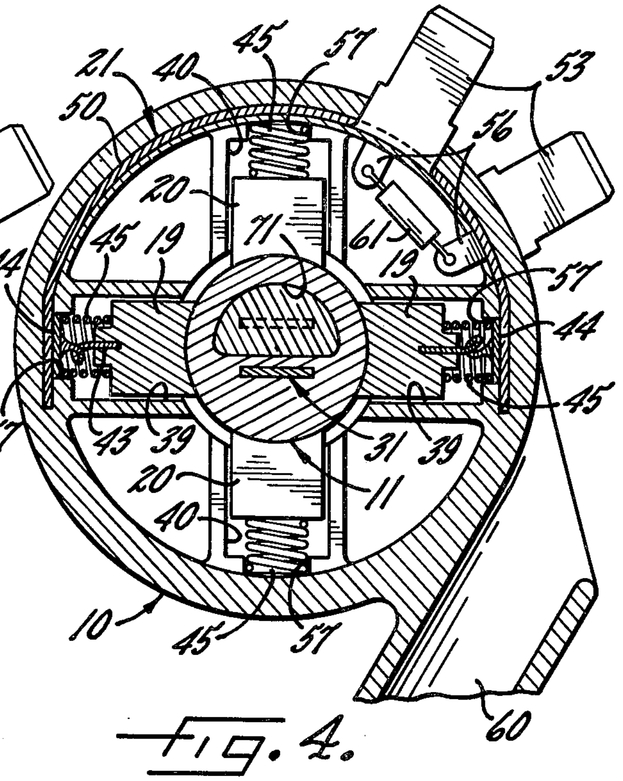
Figure 5:
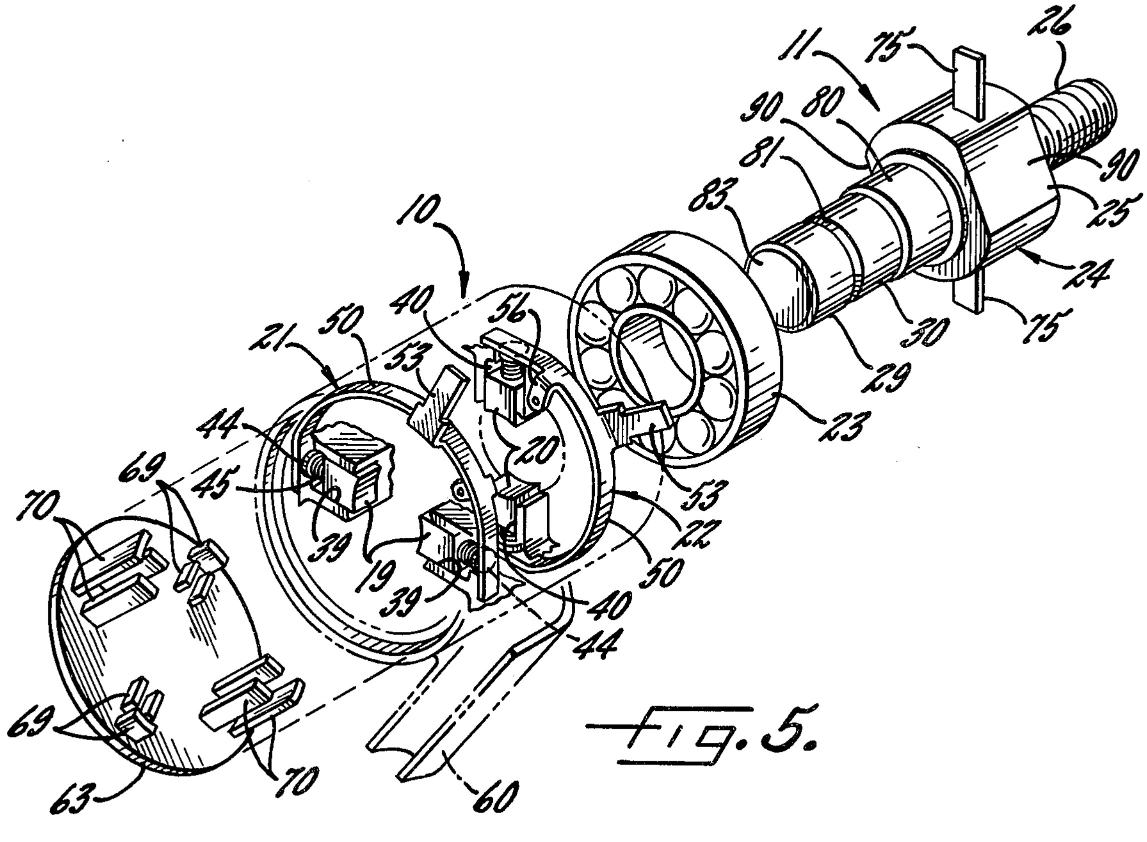
FIG. 5 is an exploded perspective view of the brush holder and slip ring assembly.
Figure 7:
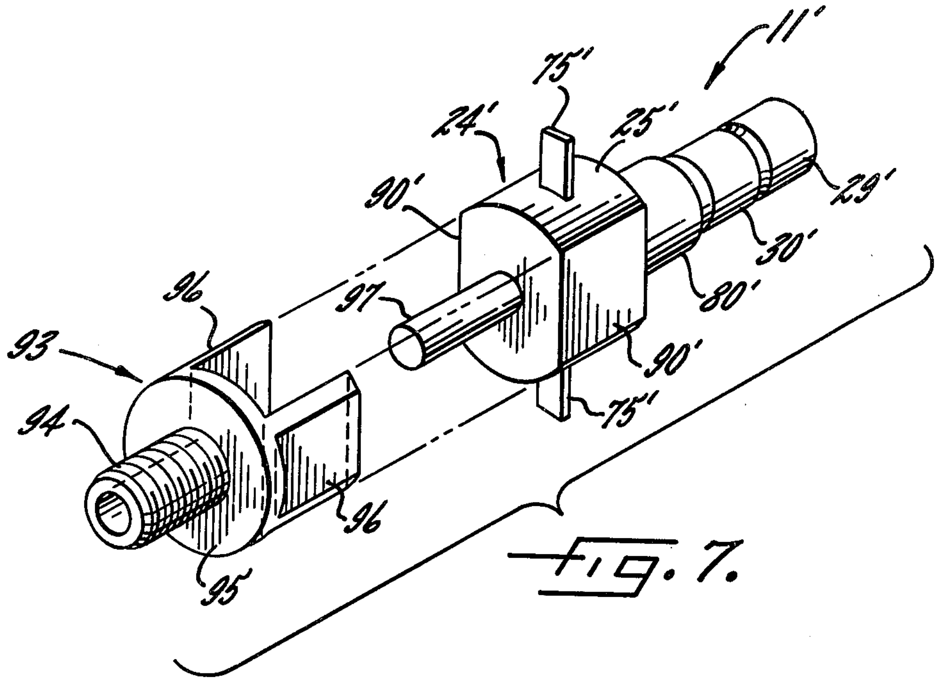
FIG. 7 is an exploded perspective view of another embodiment of a slip ring assembly incorporating the features of the invention.
Figure 8:
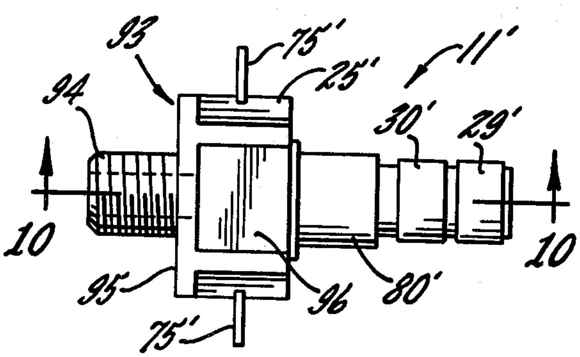
FIG. 8 is a side elevational view of the slip ring assembly shown in FIG. 7.
Figure 9:
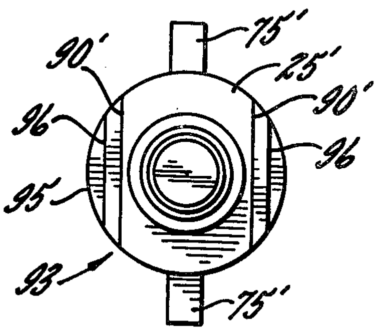
FIG. 9 is an end view of the slip ring assembly shown in FIGS. 7 and 8.
Figure 10:
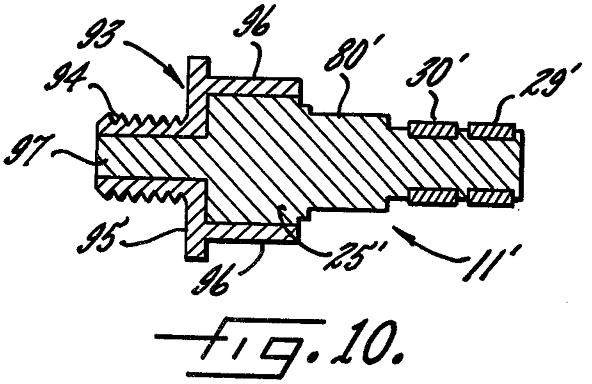
FIG. 10 is a cross-section taken substantially along the line 10—10 of FIG. 8.

Before the housing 17 is molded, the strips 21 and 22 are located in the molding dies such that the circumferentially extending portion 50 of the strip 21 will span the arc around the housing between the two brushes 19 and such that the circumferentially extending portion 50 of the strip 22 will span the arc extending around the housing between the two brushes 20 (see FIGS. 3 to 5). To position the strips 21 and 22 in this manner while keeping the two tabs 53 in approximately the same angular location, the strips are spaced axially from one another in the dies in accordance with the axial spacing between the brushes 19 and 20. In addition, the strip 21 is turned 180 degrees relative to the strip 22 about an axis extending perpendicular to the axis of the housing 17. As a result, the strip 21 spans the brushes 19, the strip 22 spans the brushes 20, the tabs 53 are spaced axially from one another but are positioned at approximately the same angular location, and the tabs 56 are spaced angularly from one another but are positioned at approximately the same axial location.

When plastic is injected into the molding dies with the strips 21 and 22 so located, the plastic which forms the cylindrical wall of the housing 17 encapsulates virtually the entire length of the circumferentially extending portion 50 of each strip while leaving the tab 53 projecting outwardly from the housing and the tab 56 projecting inwardly into the housing. The strips thus become securely locked in and assembled with the housing as an incident to the housing being molded.

Adjacent the extreme ends of the circumferentially extending portion 50 of each strip 21 and 22, the molding dies are shaped so as to form small openings or windows 57 (FIGS. 3 and 4) in the inner side of the housing 17. Accordingly, the terminal buttons 44 on the lead wires 43 of the brushes 19 and 20 may make conductive contact with the strips 21 and 22 when the brushes are placed in the housing in the guide channels 39 and 40.

With the foregoing arrangement, current is conducted between one of the terminals of the voltage source 16 and the two brushes 19 via the tab 53 and the circumferentially extending portion 50 of the strip 21. Current is conducted between the other terminal of the voltage source and the two brushes 20 by way of the circumferentially extending portion of the tab 53 and the circumferentially extending portion 50 of the strip 22. To hold the lead wires 55 which extend from the voltage source, a U-shaped channel member 60 (FIGS. 1 and 4) is molded integrally with and extends tangentially from the housing 17 at a location adjacent the tabs 53.

The inwardly projecting tabs 56 serve as terminals for the lead wires of a diode 61 (FIGS. 2 and 4) which is located within the housing 17. By virtue of the tabs 56, the diode is connected across the voltage source 16 and the brushes 19 and 20. When the switch 33 is opened to de-energize the winding of the clutch 14, voltage is induced in the winding as a result of the collapsing flux. The diode 61 is poled so as to, in effect, "flywheel" the induced current back through the winding and to prevent such current from flowing through the voltage source and arcing across the switch 33.

Completing the brush holder 10 is a plastic end cap 63 (FIGS. 2 and 5) which is adapted to telescope into the end of the housing adjacent the brushes 19 and 20. Molded integrally with the inner side of the end cap are two angularly spaced sets of short fingers 69 (FIG. 5) and two angularly spaced sets of long fingers 70. The short fingers 69 fit into the guide channels 39 and embrace and captivate the brushes 19 while the long fingers 70 fit into the guide channels 40 and embrace and captivate the brushes 20.

Further in keeping with the invention, the body 25 of the rotor 24 of the slip ring assembly 11 also is molded of rigid plastic, the slip rings 29 and 30 and the conductors 31 and 32 of the rotor being assembled in place with the body when the body is molded. Moreover, the slip rings are uniquely designed so that the rings 29 and 30 are of identical construction.

Figure 6:
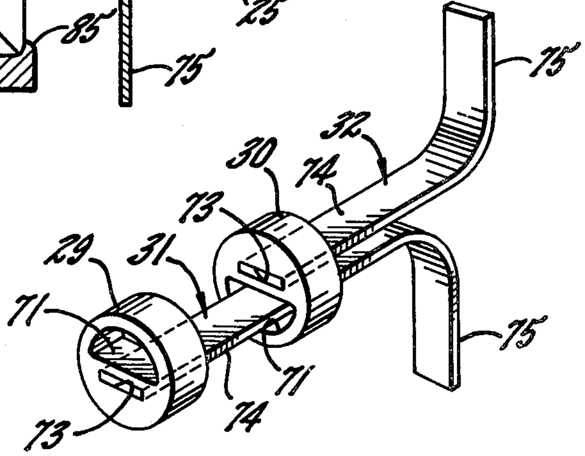
FIG. 6 is a perspective view of the slip rings and conducting elements of the slip ring assembly.

Herein, each of the slip rings 29 and 30 is in the form of a cylindrical metal disc (see FIG. 6). Formed through each disc or ring is an opening 71 which is in the shape of a half-moon and which is offset from and asymmetrical with respect to the axis of the ring. A slot 73 also is formed through each ring and is located adjacent the straight side of the opening.

Each of the conductors 31 and 32 is an elongated strip having an axially extending portion 74 (FIG. 2) adapted to be connected to the respective slip ring 29 and 30 and having a radially extending portion 75 which projects out of the body 25 of the rotor 24 to define a terminal to which the lead wires 76 (FIG. 1) of the winding of the clutch 14 may be connected. The axially extending portion 74 of the conductor strip 31 is somewhat longer than the axially extending portion 74 of the conductor strip 32.

To electrically connect the conductor strips 31 and 32 with the slip rings 29 and 30, respectively, the free ends of the axially extending portions 74 of the strips are placed in the slots 73 of the respective rings and are brazed to the rings. Thereafter, the ring 30 and the strip 32 is positioned with the radially extending portion 75 of the strip pointing upwardly (see FIG. 6) while the ring 29 is positioned rearwardly of the ring 30 with the radially extending portion 75 of the strip 31 pointing toward the opening 71 in the ring 30. When thus positioned, the strip 31 may be threaded through the opening 71 in the ring 30 and may be turned and shifted until the radially extending portion 75 of that strip points downwardly with the axially extending portion of the strip 74 paralleling the axially extending portion 74 of the strip 32. The slip rings and strips thus may be loosely assembled and, when so assembled, the slip ring 29 is turned 180 degrees abouts its own axis with respect to the slip ring 30 as is apparent from the relative positioning of the openings 71 in the two rings (see FIG. 6).

Before molding the body 25 of the rotor 24, the loose assembly of slip rings 29 and 30 and conductor strips 31 and 32 is placed in the molding dies with the slip rings spaced axially from one another in accordance with the axial spacing of the brushes 19 and 20 and with the radially extending portions 75 of the strips point in opposite directions. Thereafter, plastic is injected into the dies to form the body 25 and the threaded end portion 26 and to form a hub 80 (FIG. 5) which extends oppositely of the threaded end portion. As the plastic is injected into the dies, it encapsulates the axial portions 74 of the strips 31 and 32 and fills the space between the strips. The plastic also encapsulates the inner sections of the radial portions 75 but the outer sections thereof are left protruding from the body 25 so that they may serve as terminals.

The plastic injected into the molding dies flows through and fills the opening 71 in the slip ring 30 (see FIG. 3) so as to electrically insulate the latter from that portion of the conductor strip 31 which extends through the opening. The conductor strip 31 is somewhat narrower than the opening 71 and is held in spaced relationship with the walls thereof when the slip rings 29 and 30 are placed in the molding dies. As a result of the plastic surrounding the conductor strip 31 and filling the opening 73 in the slip ring 30, there is no danger of the strip contacting the slip ring 30. Also, the plastic in the opening effects a rigid physical connection between the slip ring 30 and the hub 80 of the rotor 24.

Figure 2:
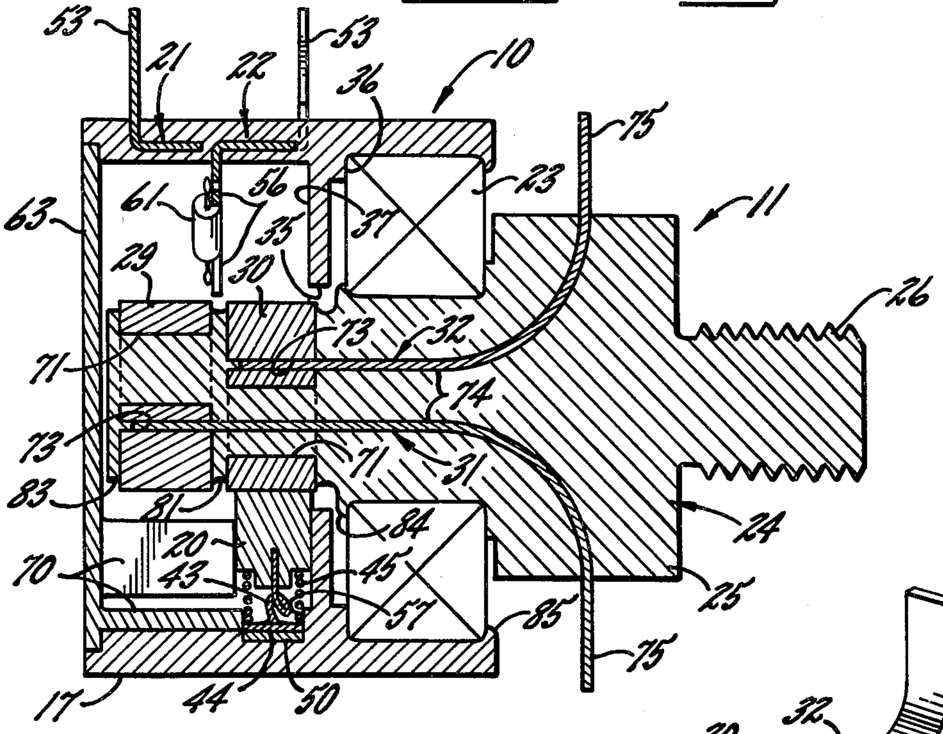
FIG. 2 is an enlarged longitudinal cross-sectional view of the brush holder and slip ring assembly shown in FIG. 1.

As shown in FIG. 2, the plastic injected into the molding dies also flows into the space between the slip rings 29 and 30 and forms a disc 81 which holds the slip rings in axially spaced relationship. The plastic also flows through and fills the opening 73 in the slip ring 29 (see FIG. 4) and, in addition, the plastic forms a disc 83 (FIG. 2) at the rear face of the slip ring 29. Accordingly, the disc 81 and the plastic within the opening 73 of the slip ring 29 connects that slip ring for rigid rotation with the slip ring 30 while the disc 83 prevents the slip ring 29 from shifting rearwardly relative to the slip ring 30.

From the foregoing, it will be apparent that the slip rings 29 and 30 and the conductor strips 31 and 32 are assembled automatically with the rotor 24 when the latter is molded. Thus, the slip ring assembly 11 may be manufactured in a simple manner and at relatively low cost.

It also is a simple procedure to assemble the slip ring assembly 11 with the brush holder 10. To effect such assembly, the bearing 23 is telescoped onto the hub 80 of the rotor 24 with a press fit and then the end of the hub is staked over at 84 (FIG. 2) against the inner race of the bearing to insure against separation of the bearing from the hub. Thereafter, the bearing with the attached rotor is pressed into the counterbore 36 of the housing 17 and the end of the housing is staked over at 85 against the outer race of the bearing.

With the slip rings 29 and 30 located within the housing 17, the brushes 19 and 20 may be inserted into the guide channels 39 and 40 and will be held radially by the slip rings. The end cap 63 then may be telescoped in and bonded to the housing 17 to captivate the brushes axially and to close the end of the housing.

As mentioned above and as is apparent from FIG. 2, the brush holder and slip ring unit 13 conducts current between the terminals 53 and the terminals 75 without relying on the bearing 23 as part of the conducting circuit. As a result, the current does not pass through and arc across the bearing and the latter thus experiences a longer service life. Moreover, the current need not flow through the shaft 15 or the bearings thereof and thus the components of those bearings will not be subjected to arcing. Accordingly, the present unit 13 not only is relatively simple and inexpensive to manufacture but also is comparatively trouble free in service use.

As shown in FIG. 5, the body 25 of the rotor 24 is formed with two diametrically opposed flats 90 which enable the rotor to be turned by a wrench for the purpose of screwing the threaded end portion 26 into the end of the shaft 15. In certain instances, it is necessary for the body 25 and the threaded end portion 26 to be of stronger and more rugged construction. Such a construction is incorporated in the embodiment shown in FIGS. 7 to 10 in which parts corresponding to those of the first embodiment are indicated by the same but primed reference numerals.

The slip ring assembly 11' shown in FIGS. 7 to 10 is characterized by a single-piece steel insert 93 which is formed with a threaded stud 94 adapted to be screwed into the shaft 15. The stud is tubular and projects forwardly from and is formed integrally with a circular disc 95. Projecting rearwardly from the disc are two ears 96 which are adapted to embrace the flats 90' on the body 25' of the rotor 24'. A forwardly projecting rod 97 is molded integrally with the body 25' and fills the space within the stud 94.

The steel insert 93 is placed in the molding dies and is adapted to be bonded to the rotor body 25' by the plastic when the body is molded. The forward end of the rod 97 may be suitably staked to prevent axial removal of the insert 93 from the body 25'.

Because the stud 94 of the insert 93 is made of steel, there is little danger of the stud shearing or becoming stripped. Also, the steel ears 96 will not be damaged by a wrench when the stud is threaded into the shaft 15.

I claim:

1. An electrical brush holder comprising a tubular housing molded of plastic, first and second axially spaced brushes guided for radial sliding within said housing, first and second axially spaced conductor strips each having a portion encapsulated within the plastic of said housing between the outer and inner sides of said housing, each of said strips also having a portion projecting outwardly from said housing and defining a terminal, and openings in said plastic in the inner side of said housing adjacent said brushes, said openings exposing parts of the encapsulated portions of said strips and enabling said first and second brushes to make electrical contact with the exposed parts of the encapsulated portions of said first and second strips, respectively.

2. An electrical brush holder comprising a tubular housing molded of plastic, a first pair of angularly spaced brushes guided for radial sliding within said housing, a second pair of angularly spaced brushes guided for radial sliding within said housing and spaced axially from the brushes of said first pair, first and second axially spaced conductor strips, each of said conductor strips having a generally radially extending portion projecting outwardly from said housing and defining a terminal, said first conductor strip having a generally circumferentially extending portion adapted to make electrical contact with the brushes of said first pair, said second conductor strip having a generally circumferentially extending portion adapted to make electrical contact with the brushes of said second pair, each of said circumferentially extending portions being encapsulated by the plastic of said housing between the outer and inner sides of said housing, and means formed in the plastic of the inner side of said housing and enabling the circumferentially extending portions of the strips to make electrical contact with the respective brushes.

3. An electrical brush holder as defined in claim 2 in which said means comprise openings in the inner side of the wall of said housing adjacent said brushes and permitting said brushes to make electrical contact with the circumferentially extending portions of the respective strips.

4. A brush holder as defined in claim 2 in which each of said conductor strips includes an additional terminal projecting radially inwardly from the circumferentially extending portion of the strip, said first and second conductor strips being identical to one another, said first conductor strip being displaced angularly relative to said second conductor strip and being turned 180 degrees relative to said second conductor strip about an axis extending perpendicular to the axis of said housing.

5. A slip ring assembly comprising first and second axially spaced conductive discs each having a circular cross-section, said discs being identical and each having an opening therethrough, the opening in each disc being asymmetrical with respect to the axis of the disc, said first disc being oriented 180 degrees about its axis with respect to said second disc, a first elongated terminal strip having a first end connected electrically to said first disc and having a second end defining a terminal, a second elongated terminal strip spaced from said first terminal strip and extending through said opening in said first disc, said second strip having a first end connected electrically to said second disc and having a second end defining a terminal, and rigid plastic material defining a body for said slip ring assembly, said plastic material filling said openings and the space between said discs and enclosing said terminal strips except for the second ends of said terminal strips, said plastic material being bonded to said discs.

6. A slip ring assembly as defined in claim 5 in which the opening in each disc is non-circular.

7. A slip ring assembly as defined in claim 5 in which each disc is formed with a slot which receives the first end of the respective terminal strip.

8. A slip ring assembly as defined in claim 5 in which each of said terminal strips includes a generally axially extending portion connected to its respective disc and further includes a generally radially extending portion whose free end projects outwardly from said plastic material and defines the second end of said strip.

9. A slip ring assembly comprising first and second axially spaced conductive discs each having a circular cross-section, each of said discs having an axially extending opening formed therethrough and each having a slot formed in one face thereof and spaced from said opening, a first elongated terminal strip having a first end portion inserted into the slot in said first disc and connected electrically to said first disc and having a second end portion defining a terminal, a second elongated terminal strip spaced from said first terminal strip and extending through said opening in said first disc in spaced relation from the wall of such opening, said second terminal strip having a first end portion inserted into the slot in said second disc and connected electrically to said second disc and having a second end portion defining a terminal, the second end portion of each terminal strip extending in a generally radial direction, and rigid plastic material defining a body for said slip ring assembly, said plastic material filling the space between said discs, the space within said openings and the space between said strips and enclosing said strips except for the second end portions of said strips.

10. An electrical brush holder and slip ring assembly comprising a tubular housing molded of plastic, first and second axially spaced brushes guided for radial sliding within one end portion of said housing, first and second axially spaced conductor strips each partially encapsulated within said housing and each having a generally radially extending portion projecting outwardly from said housing and defining a terminal, said first and second conductor strips having generally circumferentially extending portions making electrical contact with said first and second brushes, respectively, a rotor, a bearing located within the other end portion of said housing and supporting said rotor for rotation about the axis of the housing, said rotor comprising first and second axially spaced conductive discs disposed in contact with the inner ends of said first and second brushes, respectively, said first disc having an opening therethrough, a first elongated terminal strip having a first end connected electrically to said first disc and having a second end defining a terminal, a second elongated terminal strip spaced from said first terminal strip and extending through said opening in said first disc, said second terminal strip having a first end connected electrically to said second disc and having a second end defining a terminal, and rigid plastic material forming a body for said rotor, said plastic material filling the space between said discs and enclosing said terminal strips except for the second ends of said terminal strips.

11. A slip ring assembly comprising first and second axially spaced conductive discs each having a circular cross-section, said first disc having an opening therethrough, a first elongated terminal strip having a first end connected electrically to said first disc and having a second end defining a terminal, a second elongated terminal strip spaced from said first terminal strip and extending through said opening in said first disc, said second strip having a first end connected electrically to said second disc and having a second end defining a terminal, rigid plastic material defining a body for said slip ring assembly, said plastic material filling the space between said discs and enclosing said terminal strips except for the second ends of said terminal strips, a metal insert bonded to one end portion of said body by said plastic, and a threaded stud formed integrally with and projecting from said insert.

* * * * *